(12) United States Patent
Prechner et al.

(10) Patent No.: US 9,646,426 B2
(45) Date of Patent: May 9, 2017

(54) METHODS AND DEVICES FOR DETERMINING A LOCATION ESTIMATE

(71) Applicant: Intel Corporation, Santa Clara, CA (US)

(72) Inventors: Gaby Prechner, Rishon Lezion (IL); Elad Eyal, Shoham (IL)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 14/576,327

(22) Filed: Dec. 19, 2014

(65) Prior Publication Data

US 2016/0180606 A1    Jun. 23, 2016

(51) Int. Cl.
| | |
|---|---|
| *H04W 24/00* | (2009.01) |
| *G07C 5/00* | (2006.01) |
| *G07C 5/02* | (2006.01) |
| *G01S 19/34* | (2010.01) |
| *G01S 19/48* | (2010.01) |

(52) U.S. Cl.
CPC ............. *G07C 5/004* (2013.01); *G01S 19/34* (2013.01); *G01S 19/48* (2013.01); *G07C 5/008* (2013.01); *G07C 5/02* (2013.01)

(58) Field of Classification Search
CPC .......... G07C 5/004; G07C 5/008; G07C 5/02; G01S 19/34; G01S 19/48
USPC ... 455/456.1, 456.5, 404.2, 434, 67.11, 63.1, 455/67.13
See application file for complete search history.

(56) References Cited

U.S. PATENT DOCUMENTS

| | | | | |
|---|---|---|---|---|
| 7,714,778 B2* | 5/2010 | Dupray | ................. | G01S 5/0268 |
| | | | | 342/357.31 |
| 7,903,029 B2* | 3/2011 | Dupray | ................. | G01S 5/0257 |
| | | | | 342/442 |
| 8,135,413 B2* | 3/2012 | Dupray | ................... | H04W 4/02 |
| | | | | 455/456.1 |
| 8,532,670 B2* | 9/2013 | Kim | ....................... | G01S 19/16 |
| | | | | 455/26.1 |

(Continued)

OTHER PUBLICATIONS

"Amendment 3: Enhancements for Very High Throughput in the 60 GHz Band", IEEE Standard for Information technology—Telecommunications and information exchange between systems Local and metropolitan area networks—Specific requirements Part 11, (Dec. 28, 2012), 628 pgs.

(Continued)

*Primary Examiner* — Marceau Milord
(74) *Attorney, Agent, or Firm* — Schwegman Lundberg & Woessner, P.A.

(57) ABSTRACT

Generally discussed herein are systems and apparatuses for managing a plurality of location providers and/or assigning a location provider to provide a location estimate. Also discussed herein are methods of using the systems and apparatuses. According to an example a method may include receiving a location estimate request from one or more location clients, determining, using a power cost heuristic, a power cost of using each of a plurality of location providers in performing a location estimate in accord with the location estimate request, assigning the location estimate request to a location provider of the plurality of location providers associated with a lowest determined power cost, and/or providing the location estimate to the location client.

14 Claims, 6 Drawing Sheets

(56) References Cited

U.S. PATENT DOCUMENTS

| | | | | |
|---|---|---|---|---|
| 8,994,591 B2* | 3/2015 | Dupray | ............... | G01C 21/206 342/457 |
| 9,220,081 B2* | 12/2015 | Prechner | ............. | H04W 64/003 |
| 9,237,543 B2* | 1/2016 | Karr | ........................ | G01S 1/026 |
| 9,255,984 B1* | 2/2016 | Williams | ................... | G01S 5/10 |
| 9,386,472 B2* | 7/2016 | Prechner | ............... | H04W 24/10 |
| 9,456,305 B2* | 9/2016 | Prechner | ............... | H04W 4/023 |
| 2004/0198386 A1* | 10/2004 | Dupray | ................ | H04W 64/00 455/456.1 |
| 2007/0287473 A1* | 12/2007 | Dupray | .................. | H04W 4/02 455/456.1 |
| 2011/0300875 A1* | 12/2011 | Kim | ........................ | G01S 19/16 455/456.1 |
| 2012/0058775 A1* | 3/2012 | Dupray | ................ | G01S 5/0257 455/456.1 |
| 2013/0285855 A1* | 10/2013 | Dupray | .................. | G01S 19/48 342/451 |
| 2014/0274135 A1* | 9/2014 | Edge | ..................... | H04W 4/021 455/456.2 |
| 2015/0024782 A1* | 1/2015 | Edge | ....................... | H04W 4/04 455/456.3 |
| 2015/0039415 A1* | 2/2015 | Boldyrev | ............... | G06Q 30/00 705/14.41 |
| 2015/0382263 A1* | 12/2015 | Jain | ....................... | H04W 36/14 455/432.1 |

OTHER PUBLICATIONS

"TGac Channel Model Addendum Document", IEEE P802.11 Wireless LANs doc.: IEEE 802.11-09/0308r1212, (Mar. 2010), 20 pgs.

"Wireless LAN Medium Access Control (MAC) and Physical Layer (PHY) Specifications", IEEE Standard for Information Technology Telecommunications and information exchange between systems Local and metropolitan area networks—Specific requirements Part 11, (Mar. 29, 2012), 2793 pgs.

* cited by examiner

400

|  | LP 110A | LP 110B | LP 110C | LP 110D |
|---|---|---|---|---|
| PERIOD 1 | X | X | X | X |
| PERIOD 2 |  | X |  |  |
| PERIOD 3 |  | X | X | X |

*FIG. 4*

METHODS AND DEVICES FOR DETERMINING A LOCATION ESTIMATE

TECHNICAL FIELD

Some embodiments pertain to wireless networks. Some embodiments relate to wireless local area networks (WLANs) and Wi-Fi networks including networks operating in accordance with the IEEE 802.11 family of standards, such as the IEEE 802.11ac standard, the IEEE 802.11REVmc task group and/or the WiFi Location SIG (WLS). Examples generally relate to managing Location Providers (LPs) and more specifically to assigning a location estimation request to an LP using a power cost heuristic.

BACKGROUND

An LP generates geographic data, such as a location of an object. The LP may consume more power in providing the location of the object than another LP. The LP may provide a location of the object with an accuracy that is lower than may otherwise be achieved using a different LP.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed herein.

FIG. 4 illustrates, by way of example, a table detailing LPs and available operational states in accordance with some embodiments.

DESCRIPTION OF EMBODIMENTS

Figure 1:
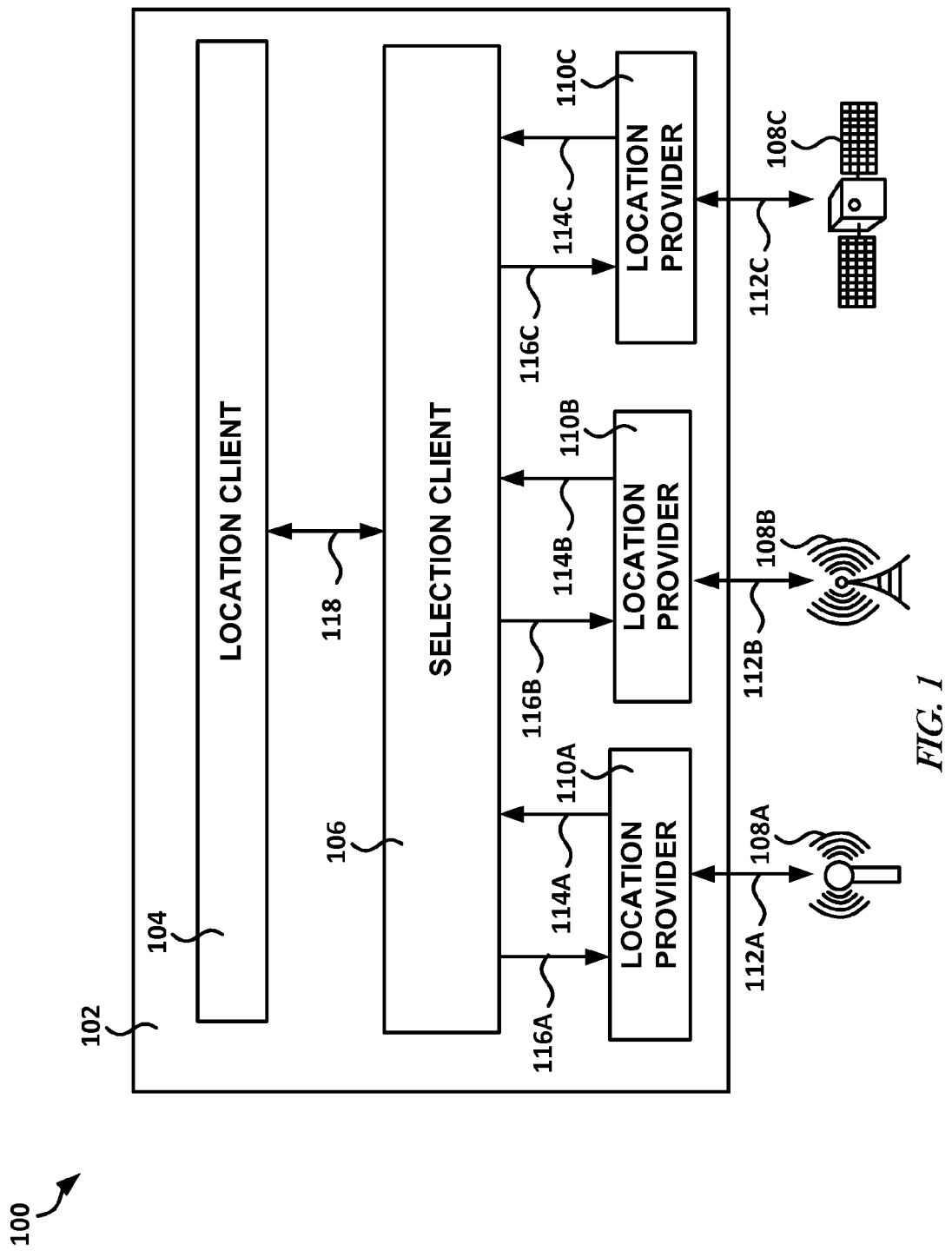
FIG. 1 illustrates, by way of example, a block diagram of an embodiment of an LP selection system.

Discussed generally herein are systems, devices, and methods for managing LPs. As described herein, various mechanisms of managing (e.g., assigning requests to) LPs may help improve location accuracy, decrease a time it takes to perform a location estimation (i.e. "get a estimation" on the location) or decrease power consumption consumed in performing the location estimation.

Outdoor navigation may include a GNSS, such as a GPS, global navigation satellite system (GLONASS), or Galileo, among others. Indoor navigation generally does not use a satellite. Indoor environments generally block or diminish the quality of a satellite signal to the point where the signal is unusable for indoor location determination. One technique of determining an indoor location includes determining a Time of Flight (ToF) of a signal to/from one or more WiFi Access Points (APs). The ToF helps in determining a range of possible locations of a wireless device. A technique of determining an indoor or outdoor location may include determining a Received Signal Strength (RSS) of a signal from one or more base stations and inferring a location based on the RSS.

An LP may determine a geographic location of the device in a number of ways, including triangulation or trilateration, for example. Global Navigation Satellite System (GNSS) triangulation may include the device receiving a code from a satellite. The device may determine how far apart the satellite and the device are (in terms of time), and thus determine a distance between the device and the satellite. Repeating this for three different satellites may yield a position of the device. Adding a measurement to a fourth satellite may help provide an offset value that accounts for the satellite and the object transmitting their codes at different times (i.e. not transmitting at the same beginning time). The position of the satellite is generally known through orbital data using a satellite's altitude, position, and speed. Various effects, like reduction of signal speed through the atmosphere, multipath error, and differences in clock timing may be accounted for in providing a location estimate. A GNSS differential Global Positioning System (GPS) LP may use a stationary receiver to calculate what timing should be based on a stationary receiver's location. The stationary receiver then transmits an error or correction factor to the satellite so that the satellite may transmit more accurate data to the object.

When a device is located indoors, the signal quality of a signal from a GNSS system may hinder the device's ability to decode GNSS signals to a point where the GNSS signal recovered may not be useful in providing an accurate location estimation. In such a situation, a device may use more processing power in attempting to decode the satellite signal from the noise. Such an increase in the signal processing increases the amount of power drawn from the device.

An indoor location determination system, such as one that uses WiFi ToF or cellular RSS, may be used to compute a device's location when the device is indoors. As the device is moved outdoors, a GNSS location may become more accurate and/or more power efficient and indoor location determination system performance may degrade and/or become less power efficient. The indoor location determination system performance may degrade because the deployment of WiFi APs outdoors may be more sparse outdoors than indoors. In such a case, in order to compute an accurate location, it may be more beneficial to use the GNSS to help determine the location, such as by having the GNSS perform a location estimate computation.

One or more LP management systems may operate in a persistent state in which an LP provides a location estimation as long as the LP is available to provide the location estimation, even if the LP does not provide a specified location estimation accuracy, does not provide the estimate within the timing constraints of the device, and/or does not meet a specified maximum power consumption. One or more LP management systems may include operating all LPs at all times, without consideration of a location estimation accuracy, timing constraints, and/or a maximum power consumption specified by a location client that requested the location estimation. One or more LP management systems may operate using pre-defined transitions between LPs that may be performed based on fixed assumptions of relative costs of using the LPs. Such LP management systems may not be power or resource efficient and may benefit from a reduction in power consumption or an increase in Quality of Service (QoS) provided, such as by increasing an accuracy of a location estimation, improving the timing of performing the location estimation, or reducing a power consumed in providing the location estimation.

The LP management systems discussed herein may reduce an amount of power consumed at the device as compared to LP management systems that include persistent LPs, LPs operating at all times, and LPs that transition based on pre-defined assumptions of relative costs of using the LPs. Since a mobile device is generally battery operated and power limited, the battery life of the mobile device may be increased by reducing the power spent in determining a location of the mobile device. Selecting an LP that may provide a location estimation in a power efficient manner may be helpful in providing an immersive combined indoor and outdoor mobile device experience.

One or more apparatuses, systems, and methods discussed herein may help in selecting an LP among a plurality of LPs to perform a location estimate, such as in a manner that may reduce power consumption, provide a location estimate with a greater accuracy or within a reduced amount of time. An LP selection choice may be based on at least one of the following parameters: 1) providing a location within a specified accuracy; 2) providing a location estimation with a relative minimum power consumption (i.e. minimum relative to all the currently available LPs); 3) providing a location estimation in a shorter time frame (i.e. providing the estimation in a shorter amount of time), and 4) a combination thereof, among others.

The LP selection mechanism may consider one or more of the following in choosing the LP to be used to provide the location estimate: 1) each LP includes one or more "operational states" that may provide different capabilities that may meet a variety of performance metrics and/or include different costs in terms of time to provide a location estimate, location estimate accuracy, or power spent in determining the location estimate; 2) each LP may provide a notification in response to a list of available operational states or performance characteristic(s) of the operational state changing (e.g., the time or power to perform the location determination has changed or the location accuracy of the location determination has changed); 3) the device performs a transition from a first LP to a second LP if (e.g., only if) the location accuracy, power, and/or time availability of the second LP suggest a better performance (e.g., less power, less time latency, or more accurate location estimate) is available from the second LP.

In one or more embodiments, a device may switch from an LP in a first operational state to the same LP in a second, different operational state or may switch to a different LP. Under these constraints, a device may switch between two LPs (or between operational states of the same LP) to improve the QoS.

One or more embodiments discussed herein may be sensitive to a dynamic fluctuation in a power requirement of an LP performing a location estimation. For example, GNSS LP power consumption in some environment conditions may be three times as high as the power consumption of the same GNSS LP under different conditions. In a mixed indoor-outdoor navigation scenario, such as one experienced when walking in an outdoor shopping center, when the device is outdoors, GNSS based location may be more power efficient than a Wi-Fi based location solution. When the device is inside a shop, a GNSS based location may become more expensive in terms of power and less accurate. The faster the outdoor LP is switched to an indoor LP, the more power that may be saved at the device.

FIG. 1 illustrates, by way of example, a block diagram of an embodiment of an LP selection system 100. The LP selection system 100 as illustrated includes a device 102 and a plurality of location sources 108A, 108B, and 108C. The device 102, as illustrated, includes one or more location clients 104, a selection client 106, and a plurality of location providers 110A, 110B, and 110C.

The device 102 may be a mobile device. In some embodiments, the device 102 may be a mobile device, such as a communication station (STA), a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Compo sable Computing (DCC), an "Origami" device or computing device, a video device, an audio device, an A/V device, a gaming device, a media player, a Smartphone, a tablet, a "Phablet" device, or the like.

The device 102 is capable of communicating content, data, information and/or signals via a wireless medium (WM). In some demonstrative embodiments, WM may include, for example, a radio channel, a cellular channel (including WiMAX), as indicated by the arrow 112B, a Global Navigation Satellite System (GNSS) Channel, as indicated by the arrow 112C, a Radio Frequency (RF) channel, a Wireless Fidelity (WiFi) channel, as indicated by the arrow 112A, an infrared (IR) channel, a Bluetooth (BT) channel, and the like.

The device 102 may include at least one radio (radio not depicted in FIG. 1, see FIG. 6) to perform wireless communication between the location source 108A-C and one or more LPs 110A-C. The selection client 106 receives location or status information from the LPs 110A-C, such as through the connection 114A, 114B, and 114C. The selection client 106 may transmit a command or request to the LPs 110A-C, such as through the wired of wireless connection 116A, 116B, and 116C.

The location client 104 may include an application, such as may be implemented in software, hardware, firmware, and/or a combination thereof. The location client 104 may use the location of the device 102, as determined by the LP 110A-C and received through the wired or wireless connection 118, in performing one or more operations of the application. The location client 104 may include an application and/or service, such as may include geo fencing, navigation, a commercial application, a social application, and/or the like. In one or more embodiments, the location client 104 may include an indoor navigation application, an outdoor navigation application, or a hybrid indoor-outdoor navigation application. The location client 104 sends a request for a location estimate of the device 102.

The request from the location client 104 may include one or more specified performance parameters with respect to the location estimation. For example, the location client 104 may send a first request that specifies a performance parameter indicating that the location client 104 wants to receive the location estimation periodically or once, at a first accuracy level (e.g., a maximum error or range of locations in the location estimation), and/or at a first maximum power consumption, while a second request may specify a performance parameter indicating that the location client 104 wants to receive the location estimation at a second accuracy level, in a specified time frame, and/or at a second maximum power consumption.

The selection client 106 may dynamically switch from using one LP, for example, if the LP is not suitable to provide the location estimation with the accuracy, power, or timing constraint(s) specified in the performance parameter(s), and/or if another LP is more suitable to provide the location estimation with the specified accuracy, lower power, and/or within better timing constraint(s).

The selection of LPs, by the selection client 106, may be accomplished considering multiple location estimate requests simultaneously. The selection client 106 may apply a power cost heuristic that considers the performance parameters of one or more of the requests and the capabilities of the LPs 110A-C. Based on results of applying the power cost heuristic, the selection client 106 matches the requests to the LPs that best fit the performance parameters of the requests, such as to minimize power consumption at the device 102, provide a location estimation with a specified accuracy, and/or to meet a timing constraint of the one or more requests. More details regarding the power cost heuristic and the LP selection are presented below.

The location sources 108A-C include, for example, GNSS satellites, APs, RF transmitters, RF beacons, cellular base stations, BT devices, and/or the like. The location provider 110A-C may determine a location estimation of the device 102, based on the location information from the location source 108A-C.

The LPs 110A-C may determine the location estimation of device 102, for example, based on the location information from the location sources 108A-C. The LPs 110A-C, as illustrated, include a WiFi LP 110A, a cellular LP 110B, and a GNSS LP 110C. The GNSS LP 110C may determine the location estimation of the device 102, for example, based on location information from the GNSS source 108C (e.g., one or more GNSS satellites). The cellular LP 110B may determine the location estimation of the device 102 based on location information from the cellular source 108B (e.g., one or more cellular base stations). The WiFi LP 110A may determine the location estimation of the device 102 based on location information from the WiFi source 108A (e.g., one or more WiFi Access Points (APs)). One or more of the LPs 110A-C may determine location information using a ToF, triangulation, Received Signal Strength Indication (RSSI), Time Difference of Arrival (TDOA), or other location determination technique.

The LPs 110A-C may determine a location estimation of the device 102 using the location information received (through the connection 114A-C) from the location sources 108A-C. One LP of the plurality of LPs 110A-C may consume a first amount of power to determine the location estimation of the device 102, and another LP of the plurality of LPs 110A-C may consume a second, different amount of power to determine the location estimation of the device 102. The second amount of power may be greater or lesser than the first amount of power depending on the environment the device 102 is in. For example, the LP 110C or 110B may provide a location using less power than the LP 110A when the device 102 is outdoor and the LP 110A may provide a location using less power than the LP 110B-C when the device 102 is indoor.

One LP of the plurality of LPs 110A-C may provide a location estimation of the device 102 that is accurate to within a first range of locations, and another LP of the plurality of LPs 110A-C may provide a location estimation of the device 102 that is accurate to within a second range of locations. The second range of locations may be greater or lesser than the first range of locations depending on the environment the device 102 is in. For example, the LP 110B-C may provide a more accurate location (a location estimation accurate to within a smaller range of locations) than the LP 110A when the device 102 is outdoor and the LP 110A may provide a more accurate location than the LP 110B-C when the device 102 is indoor.

The selection client 106 may select one or more LPs 110A-C to provide the location estimation of the device 102 for the location client 104. The selection client 106 may assign one or more LPs 110A-C for each request from a location client 104. The selection client 106 selects at least one active LP 110A-C per request to provide the location estimation to the location client 104. The selection may be based on a heuristic (i.e. a cost analysis in terms of power consumption, a time it takes to perform the location estimation or an accuracy of the location estimation). The selection client 106 LP increases a power consumption of the device 102, provide a location estimation with a reduced accuracy than might otherwise be possible, or not satisfy a request in a timely manner by selecting all LPs 110A-C for each request. For example, the location client 104 may receive a location estimation having a reduced accuracy or higher power consumption than might otherwise be possible if the selection client 106 assigns the LP 110B-C to the request when the mobile device 102 is within an indoor location.

The LP 110A-C is capable of providing the location estimation when the device 102 is in certain environments. The LP 110A-C may satisfy one or more of the performance parameters detailed in the request or may be an LP that comes closest to providing the capability to satisfy the one or more performance parameters. For example, the selection client 106 may determine that the LP 110A has the capability to satisfy all the performance parameters detailed in the request and assign the LP 110A to that request. In another example, the selection client 106 may determine that none of the active LPs are capable of satisfying all the performance parameters in the request so the selection client 106 selects the LP 110A-C that comes closest to satisfying the performance parameters.

Figure 2:
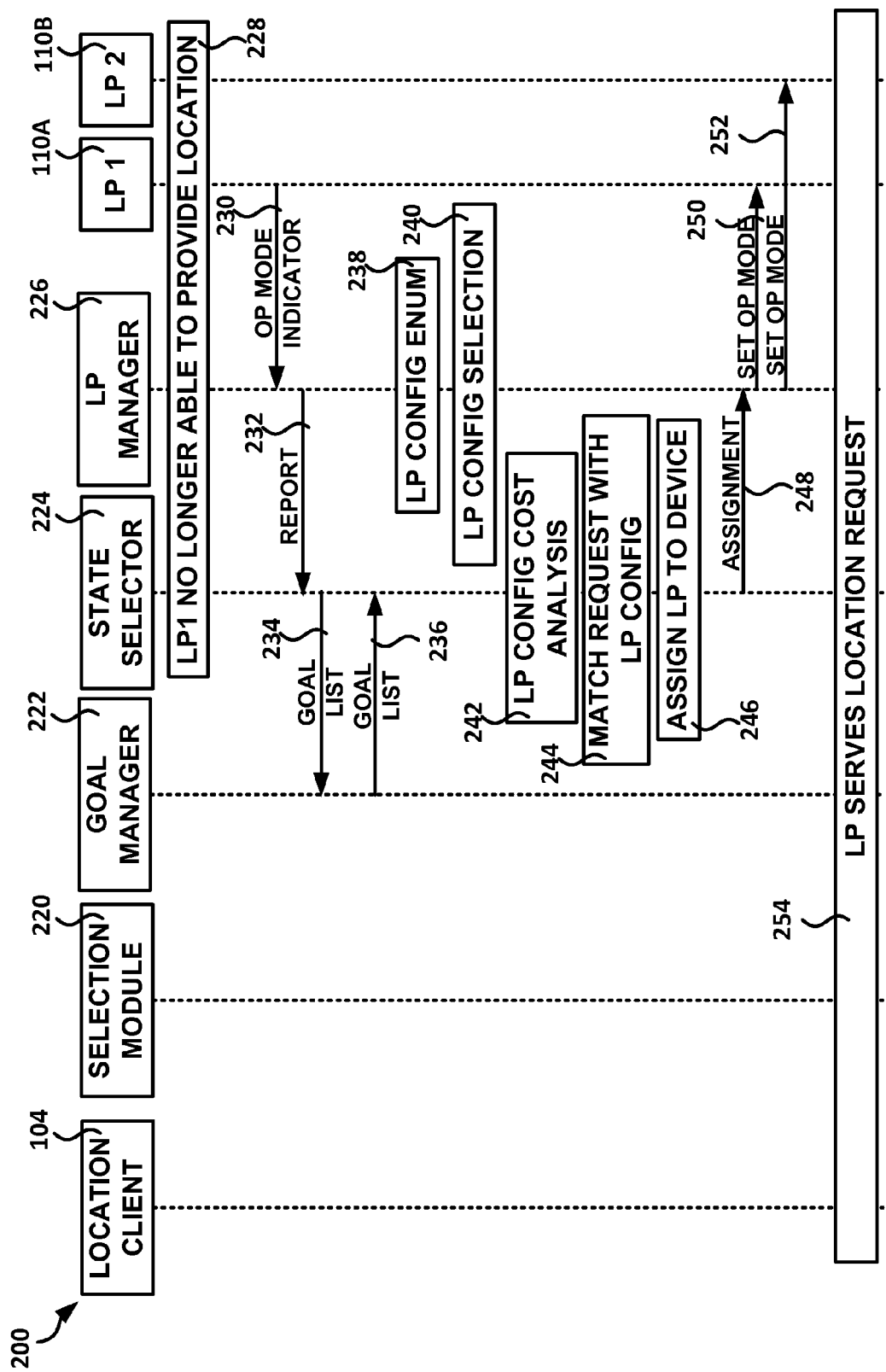
FIG. 2 illustrates, by way of example, a block diagram of an embodiment of a timing and communication diagram of an LP selection system.

FIG. 2 illustrates, by way of example, a block diagram of an embodiment of a timing and communication diagram 200 of an LP selection system, such as the LP selection system 100 or 300. The LP selection system as illustrated in FIG. 2 includes one or more location clients 104, one or more selection modules 220, one or more goal managers 222, one or more state selectors 224, one or more LP managers 226, and a plurality of LPs 110A-B. The selection module 220, goal manager 222, state selector 224, and LP manager 226, may be parts of the location client 106.

The selection module 220 may be implemented in hardware, software, firmware, or a combination thereof. The selection module 220 triggers an assignment of a request to an LP 110A-C. The selection module 220 may trigger the assignment in response to at least one of a new location request received at the selection client 106, a location request abort command received at the selection client 106 from the location client 104, and an operational state change indication from an LP 110A-C. The selection module 220 may communicate with other items of the LP selection system, such as to request information from the other items.

The goal manager 222 may be implemented in hardware, software, firmware, or a combination thereof. The goal manager 222 receives requests and/or associated performance parameters of the requests from the location client 104, such as at 234. The goal manager 222 may collate requests that include one or more similar or same performance parameters. The collated requests may be provided to the state selector, such as at 236. Such collation may reduce a complexity of matching an LP 110A-C to a request with specific performance parameters, such matching may be performed by the state selector 224. For example, if a location client 104 requests a location estimation with a high accuracy estimation and another location client requests a location estimation with no accuracy level specified, the goal manager 222 may collapse these two requests into a single request, because the requests may be assigned to the same LP 110A-C. The collated or uncollated requests and/or associated performance parameters may be sent to the state selector 224 as "goals" in a "goals list", such as at 236.

The LP manager 226 may be implemented in hardware, software, firmware, or a combination thereof. The LP manager 226 maintains a model of the performance characteristics of the LPs 110A-C including which operational state(s) of the LPs are available. The operational state(s) may be provided to the LP manager 226 by the LP 110A-D, such as at 230. The LP manager 226 collects the operational state data from the LPs 110A-C, such as in response to a characteristic of the operational state of the LP 110A-C changing. The definition of an operational state of an LP 110A-C may include one or more of whether a location estimation is available upon request supported (e.g., as a binary number), a maximum time to perform a location estimation (e.g., specified in any increment of time, such as seconds or less, minutes, hours, etc.), whether a periodic location estimation is available, if the periodic location estimation is available then a minimum and/or a maximum interval of the location estimation that is available or an enumeration of the time interval(s) available, a best case expected error, a worst case expected error, an energy consumption per unit time, K, an energy consumption per transition into operational state, I, and an energy consumption per location estimation, F.

The LP manager 226 may provide the state selector 224 possible operational states of the LPs 110A-C in a report, such as at 232. The report can detail "exclusivity groups" that include lists of operational states of LPs 210A-C that may be enabled (e.g., simultaneously) to help satisfy the performance parameters and/or the request(s). The process of making the report is called LP configuration enumeration herein and is represented at 238. The LP manager 226 may help ensure that the operational states provided to the state selector 224 by eliminating a possibility that the state selector 224 selects an impossible combination of LP operational states. The LP manager 226 may do this by making sure that the exclusivity groups include only sets of operational states that may co-exist.

The state selector 224 selects the operational states of LPs 110A-C to be enabled that best meets the performance parameters of the request(s) according to a heuristic, such as at 240. The state selector 224 may select a group of operational states from the exclusivity groups that meets all performance parameters or as many goals as possible while having a lower power consumption than another (e.g., all other) exclusivity groups that satisfy the same number of performance parameters.

The state selector 224 may match operational states from an exclusivity group to the performance parameter of a request in the exclusivity group. For example, an LP includes an operational state that provides a periodic location estimation of five seconds and a location client 104 has issued a request with a performance parameter indicating that the location client 104 wants the request to recur every five seconds, the state selector 224 may match the location client 104 with the LP 110A-C in the matching operational state.

The LP manager 226, as previously discussed, may enumerate all possible, valid LP 110A-D exclusivity groups, such as at 240. Sometimes an exclusivity group may be dismissed (e.g., filtered out) prior to performing the power cost heuristic on the exclusivity group. For example, if a request from a location client 104 includes a request for a GNSS based location estimation and none of the LP operational states of the exclusivity group include a GNSS location estimation, then that exclusivity group may be filtered out.

Each request is assigned to an LP 110A-D, such as at 246, after being matched to an LP at 244. The state selector 224 may communicate the assignments to the LP manager 226 at 248. The requests may be assigned to an LP 110A-D in a first come first served, a random, or other order. For each individual request, an LP 110A-D and corresponding operational state of the LP 110A-D most suitable for the performance parameter(s) of the request are assigned to the request, taking into account the requests assigned previously. If several periodic requests are assigned to the same LP 110A-D, then the periodicity of the location estimation may be the LCD (Least Common Denominator) for the several periodic requests. For example, if a request with a performance parameter of periodic with ten second period and a request with a performance parameter of periodic with a fifteen second period are assigned to the same LP 110A-D, the periodicity may be the LCD of ten and fifteen, which is five. The process is non-commutative. That is, the order in which requests are processed may change the outcome of the process.

Multiple heuristics are proposed for performing a cost analysis of the LP 110A-D in handling a request, such as may be performed at 242. Some heuristics generally require more computational resources than the first heuristic, but may be less likely to fail to assign a request based on the order the requests are assigned. The first heuristic includes assigning the request to the LP 110A-D in an operational state with the lowest F/periodicity, where the periodicity may be divided by the LCD as previously discussed. A second heuristic may include for each request and/or corresponding performance parameters, calculate the total power cost F/periodicity of each assignment, taking into consideration the LCD which will be selected. Then select the cheapest assignment, in terms of power. The order of traversal of requests may be randomly or otherwise selected. The state selector 224 may only change the LP 110A-D assigned to a request to a different LP 110A-D if the new assignment would reduce time and/or power. In this way, even if the state selector 224 selected a sub-optimal solution, the solution may be improved in time through further iterations through the process.

Another power cost heuristic may include summing (e.g., weighting and summing) the K, I, and F for each LP 110A-D and each LP 110A-D operational state, such as all LPs 110A-D and operational states specified in an exclusivity group. The total cost for an LP 110A-D operating in a specific operational state (per unit time) may be calculated as a sum $(K_i+T+F/(LCD))$. The request may be assigned to the LP 110A-D with the lowest power cost as per the chosen heuristic.

The chosen assignments are communicated to LPs 110A-D using a command, "SET OP STATE", such as at 250 and 252 (which may also communicate periodic requests)

and "START ONE TIME LOCATION" request. The assignment may remain valid until an "OPERATIONAL STATE INDICATOR" is issued, such as at 230 (i.e. an operational state characteristic changes and the corresponding LP 110A-D alerts the LP manager 226 of such change). The LP 110A-D provides a location estimate to satisfy each of the requests assigned to the LP 110A-D at 254. The process may start over after an operational state has changed for an LP 110A-D or a specified period of time has passed.

Figure 3:
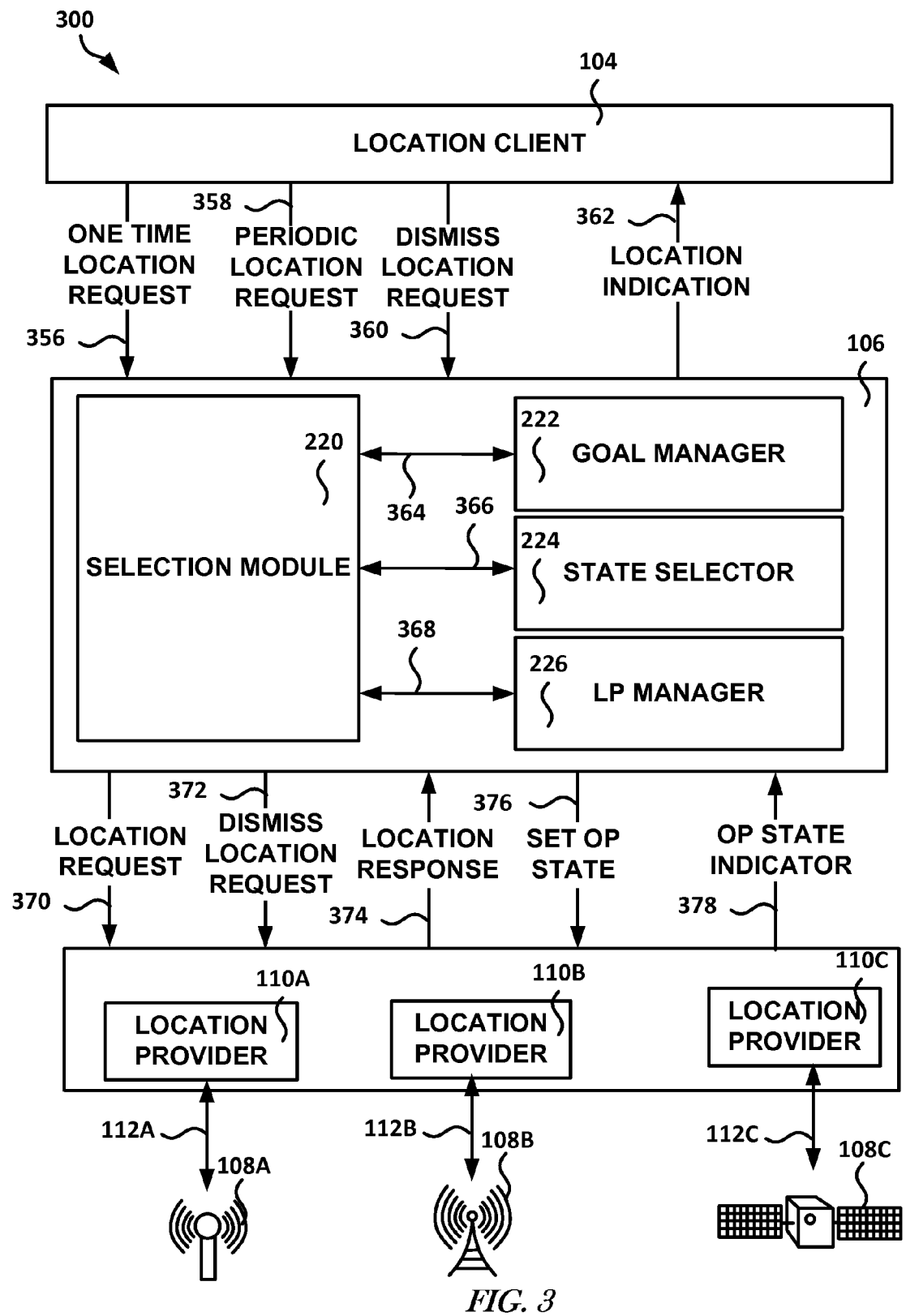
FIG. 3 illustrates, by way of example, a block diagram of an embodiment of another LP selection system.

FIG. 3 illustrates, by way of example, a block diagram of an embodiment of another LP selection system 300. The LP selection system 300 as illustrated includes a location client 104, a selection client 106, a plurality of LPs 110A-C, and a plurality of location sources 108A-C. The location client 104 may send a variety of communications to the selection client 106.

Generally, the various communications from the location client 104 are requests with different performance parameters. The request(s) from the location client 104 may include a one-time location request (i.e. a request with no periodicity performance parameter), such as at 256, a periodic location request (i.e. a request with a periodic performance parameter and/or a time period for the request to recur), such as at 258, or a dismiss location request, such as at 260. The requests from the location client 104 may include an identifier to identify the location client 104 that issued the request. The requests from the location client 104 may specify a variety of other performance parameters, such as a maximum power consumption, a maximum time, or a maximum error in performing the request. The request may include an identifier that uniquely identifies the request that may be referenced when the location client 104 issues a dismiss location request 260. The location client 104 may receive a location indication 262 that conveys the location information determined by the LP 110A-C assigned to the request. The location indication 262 may include an identifier that indicates the LP 110A-C that performed the request.

The selection client 106 as illustrated includes the selection module 220, the goal manager 222, the state selector 224, and the LP manager 226. In one or more embodiments, the selection module 220 manages communications between the goal manager 222, the state selector 224, and/or the LP manager 226, such as through the wired or wireless connections 364, 366, and 368. In one or more embodiments, the goal manager 222, the state selector 224, and/or the LP manager 226 communicate directly to each other. The goal manager 222 may receive the requests and performance parameters and collate them. The LP manager 226 may receive operational state data from the LPs 110A-C. The state selector 224 may match a request to an LP 110A-C by assigning a power cost to each operational state of each LP 110A-C using heuristic and determining which LP 110A-C may best perform the request.

The selection module 220 may provide a location request 370 to the LPs 110A-C indicating an operational state to be used in performing the request and the LP 110A-C that is to perform the request. The selection client 106 may provide a communication to the LPs 110A-C that indicates a request identification that has been dismissed, such as through the location client 104 issuing a dismiss location request 360. The LPs 110A-C provide the selection client 106 with a location response 374. The location response 374 may identify the request the location response 374 satisfies. The location response 374 may identify the location client 104 and/or the LP 110A-C associated therewith.

The selection client 106 may set an operational state of an LP 110A-C by issuing a set operational state command 376. The set operational state command 376 may include an indication of an LP 110A-C and an operational state for the indicated LP 110A-C. The LP may indicate that an operational state of the LP 110A-C has changed by issuing an operational state indicator 378. The operational state indicator 378 identifies an LP 110A-C, the operational state of the LP 110A-C that has changed, and how the operational state has changed.

FIG. 4 illustrates, by way of example, a table 400 that depicts an example of how the state selector 224 may organize information from the location client 104 and the LPs 110A-C in matching a request and performance parameter to an operational state of an LP 110A-C. The LPs 110A-C may be ordered, at least conceptually, in accord with the LP's corresponding power cost as determined by the applied power cost heuristic in a row or column and the possible times of periodic requests in a corresponding column or row. An "x" in a box indicates that the performance parameter may be served by the LP 110A-D in the operational state. Thus, in the example of FIG. 4, the LP 110A may provide a periodic location estimation at five second intervals with little cost, where the cost is determined by a power cost heuristic, as discussed herein. In the example of FIG. 4, LP 110C is more expensive than LP 110B in providing a location estimation, so the state selector 224 may choose the LP 110B to perform the location estimation if given a choice between the LP 110B and 110C. Table 400 is a simplified example that does not consider accuracy or latency in providing a location estimation, but these variables can be treated similar to the power cost and a request may be matched accordingly.

Figure 5:
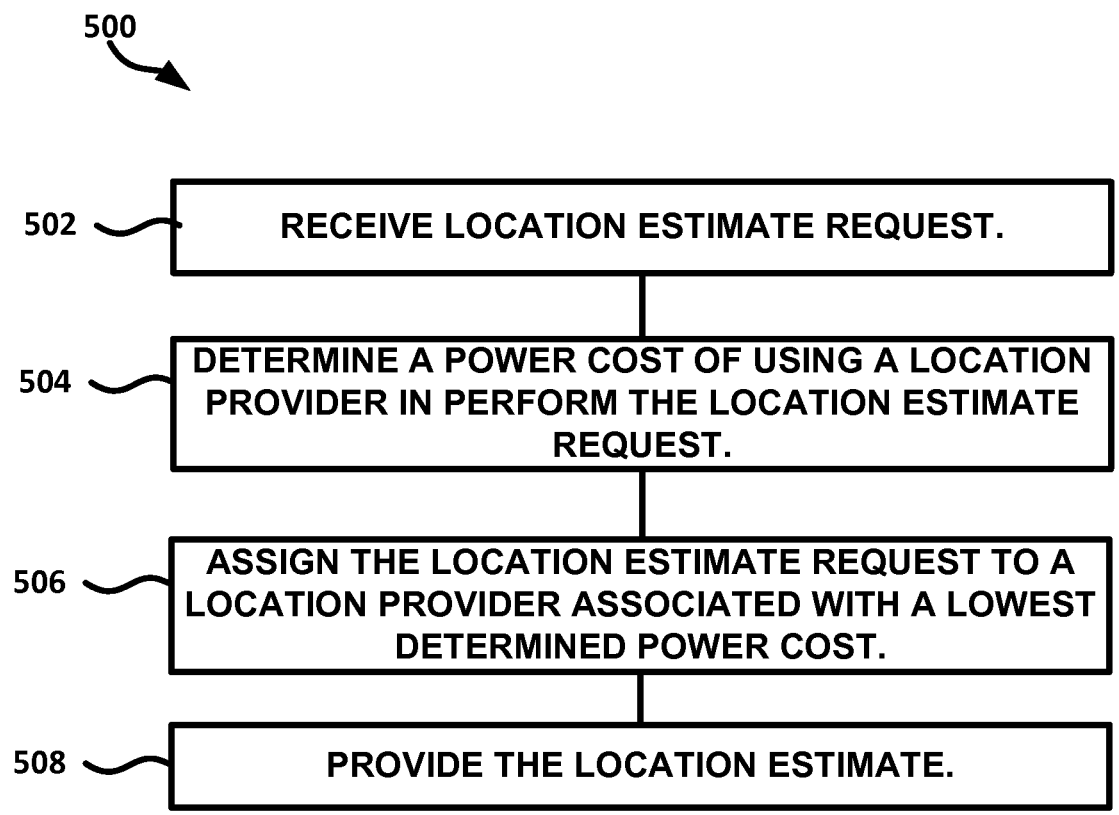
FIG. 5 illustrates, by way of example, a flow diagram of an embodiment of a method.

FIG. 5 illustrates, by way of example, a flow diagram of an embodiment of a method 500. The method 500 as illustrated includes: receiving a location estimate request, at operation 502; determining a power cost of using an LP in performing the location estimate request, at operation 504; assigning the location estimate request to a location provider associated with a lowest determined power cost, at operation 506; and providing the location estimate, at operation 508. The location estimate request may be received from a location client. The operation at 504 may include determining a power cost of using each of a plurality of LPs in performing the location estimate request received at operation 502. The location estimate may be provided to the location client.

The power cost heuristic may include the energy consumption per location estimate divided by a lowest common denominator of the time periods of periodic requests assigned to the location provider of the plurality of location providers. The power cost heuristic may include a sum of the energy consumption per unit time in performing the location estimate, the energy consumption per transition into the operational state, and the energy consumption per location estimate.

The method 500 may include receiving one or more performance parameters associated with the location estimate request, the performance parameters comprising at least one of a maximum power, a maximum time, and a maximum error to be used in satisfying the location estimate request. The method 500 may include receiving from each of the plurality of location providers a list of available operational states, each operational state including one or more of a plurality of characteristics including whether a location estimate is available upon request, a maximum time it takes to complete a location estimate, whether a periodic location estimate is available, a time period the periodic location estimate is available, a best case expected error in the location estimate, a worst case expected error in the location estimate, an energy consumption per unit time in performing the location estimate, an energy consumption per transition into the operational state, and an energy consumption per location estimate.

The operation at 506 may include comparing the one or more performance parameters to a characteristic of the plurality of characteristics and assigning the request to the location provider that includes a characteristic that best matches the performance parameter with the lowest determined power cost. The method 500 may include assigning the received location estimate request to a different location provider of the plurality of location providers only if the different location provider provides the location estimate with a lower determined power cost, a lower maximum time it takes to complete a location estimate as detailed in the list of operational states, or a lower worst case expected error in the location estimate as detailed in the list of operational states than is provided by a location provider of the plurality of location providers currently assigned to perform the location estimate.

Figure 6:
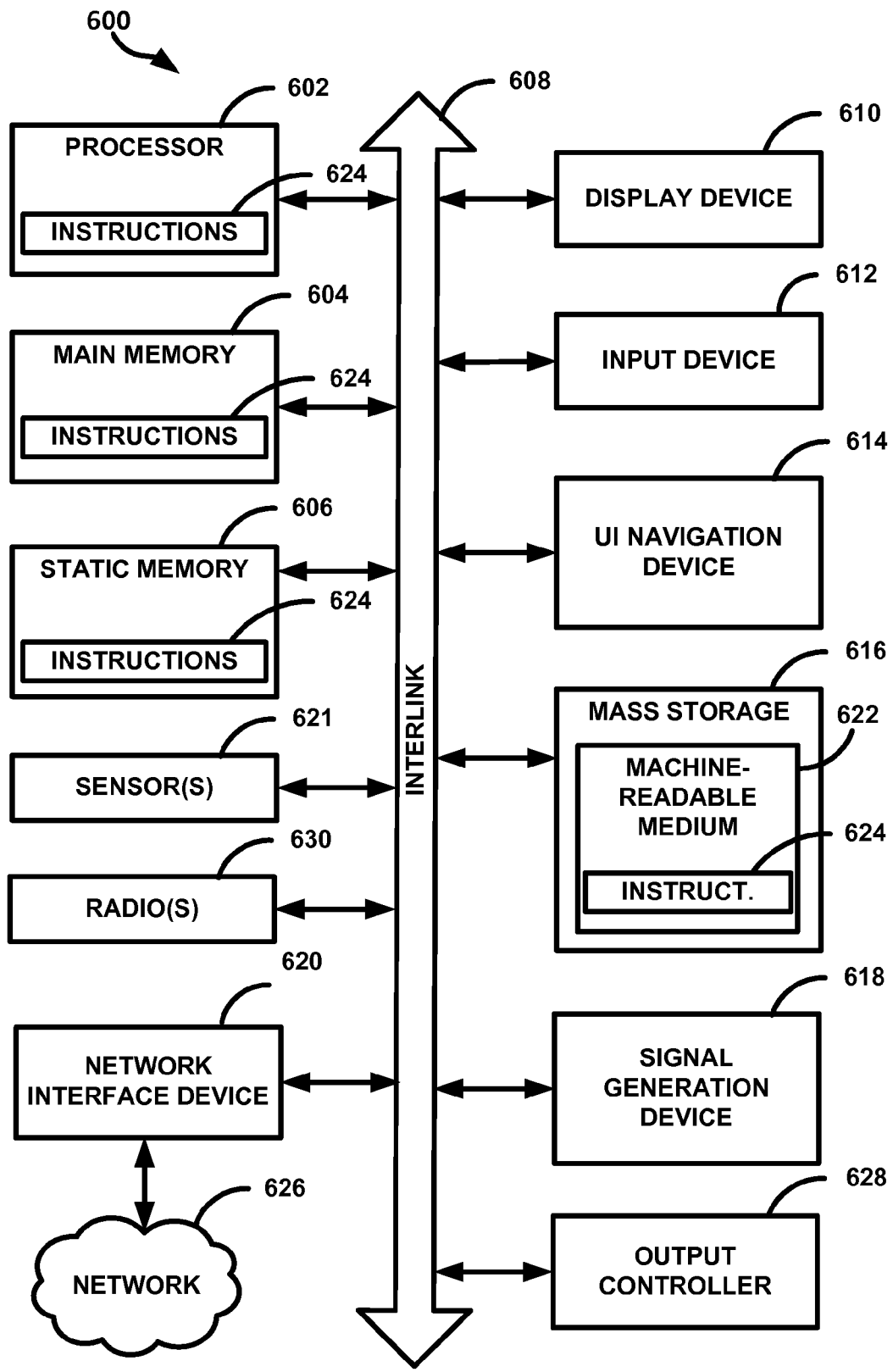
FIG. 6 illustrates, by way of example, a block diagram of an embodiment of a device upon which any of one or more methods discussed herein may be performed.

FIG. 6 illustrates, by way of example, a block diagram of an embodiment of a device 600 upon which any of one or more methods discussed herein may be performed. The device 600 (e.g., a machine) may operate so as to perform one or more of the programming or communication techniques (e.g., methodologies) discussed herein. In some examples, the device 600 may operate as a standalone device or may be connected (e.g., networked) to one or more modules, such as the location client 104, selection client 106 (e.g., the selection module 220, goal manager 222, state selector 224, and/or the LP manager 226), or the LPs 110A-C. In other examples, the one or more items of the device 600 may be a part of the location client 104, selection client 106 (e.g., the selection module 220, goal manager 222, state selector 224, and/or the LP manager 226), or the LPs 110A-C, as discussed herein.

Embodiments, as described herein, may include, or may operate on, logic or a number of components, modules, or mechanisms. Modules or clients are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively may be coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Device (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The device 600 may further include a display unit 610, an input device 612 (e.g., an alphanumeric keyboard), and a user interface (UI) navigation device 614 (e.g., a mouse). In an example, the display unit 610, input device 612 and UI navigation device 614 may be a touch screen display. The device 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The device 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 600 may include one or more radios 630 (e.g., transmission, reception, or transceiver devices). The radios 630 may include one or more antennas to receive signal transmissions. The radios 630 may be coupled to or include the processor 602. The processor 602 may cause the radios 630 to perform one or more transmit or receive operations. Coupling the radios 630 to such a processor may be considered configuring the radio 630 to perform such operations. In general, an item being "caused" to perform an operation includes the item receiving data, interpreting the data as a command to perform an operation, and performing the operation. The signal does not have to be issued by the item that is causing the other item to perform the operation. Generally, "a first item causing a second item to perform an operation" means that the first item provided data that is already properly formatted to communicate with the second item or needs formatting and eventually becomes data that the second item receives and interprets as a command to perform the operation.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the device 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624. The term "machine readable medium" may include any tangible medium that is capable of storing, encoding, or carrying instructions for execution by the device 600 and that cause the device 600 to perform any one or more of the techniques of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.6 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 600, and includes digital or analog communications signals or other intangible medium to facilitate communication of such software.

Examples and Notes

The present subject matter may be described by way of several examples.

Example 1 may include or use subject matter (such as an apparatus, a method, a means for performing acts, or a device readable memory including instructions that, when performed by the device, may cause the device to perform acts), such as may include or use processing circuitry (e.g., a selection client) to: receive a location estimate request from one or more location clients, determine, using a power cost heuristic, a power cost of using each of a plurality of location providers in performing a location estimate in response to the location estimate request, assign the location estimate request to a location provider of the plurality of location providers associated with a lowest determined power cost, and provide the location estimate to the location client.

Example 2 may include or use, or may optionally be combined with the subject matter of Example 1, to include or use, wherein the processing circuitry is further to receive one or more performance parameters from the one or more location clients, the performance parameters comprising at least one of a maximum power, a maximum time, and a maximum error to be used in determining the location estimate of the device.

Example 3 may include or use, or may optionally be combined with the subject matter of at least one of Examples 1-2, to include or use, wherein the processing circuitry is further to receive from each of the plurality of location providers a list of available operational states, each operational state including one or more of a plurality of characteristics including whether a location estimate is available upon request, a maximum time it takes to complete a location estimate, whether a periodic location estimate is available, a time period the periodic location estimate is available, a best case expected error in the location estimate, a worst case expected error in the location estimate, an energy consumption per unit time in performing the location estimate, an energy consumption per transition into the operational state, and an energy consumption per location estimate.

Example 4 may include or use, or may optionally be combined with the subject matter of Example 3, to include or use, wherein the processing circuitry is further to assign the location estimate request to a location provider of the plurality of location providers by comparing the one or more performance parameters to a characteristic of the plurality of characteristics and assigning the request to the location provider that includes a characteristic that best matches the performance parameter with the lowest determined power cost.

Example 5 may include or use, or may optionally be combined with the subject matter of at least one of Examples 1-4, to include or use, wherein the power cost heuristic includes the energy consumption per location estimate divided by a lowest common denominator of the time periods of periodic requests assigned to the location provider of the plurality of location providers.

Example 6 may include or use, or may optionally be combined with the subject matter of Examples 1-4, to include or use, wherein the power cost heuristic includes a sum of the energy consumption per unit time in performing the location estimate, the energy consumption per transition into the operational state, and the energy consumption per location estimate.

Example 7 may include or use, or may optionally be combined with the subject matter of at least one of Examples 1-6, to include or use, wherein the plurality of location providers include a Wi-Fi location provider, a satellite location provider, and a cellular location provider.

Example 8 may include or use, or may optionally be combined with the subject matter of at least one of Examples 1-7, to include or use, wherein the plurality of location providers determine the location estimate using a Time of Flight (ToF) of a signal from the device to the location provider and back to the device, triangulation and a Received Signal Strength Indication (RSSI) technique.

Example 9 may include or use, or may optionally be combined with the subject matter of at least one of Examples 1-8, to include or use, wherein the processing circuitry is to assign the received location estimate request to a different location provider only if the different location provider provides the location estimate with a lower determined power cost, a lower maximum time it takes to complete a location estimate as detailed in the list of operational states, or a lower worst case expected error in the location estimate as detailed in the list of operational states than is provided by a location provider of the plurality of location providers currently assigned to perform the location estimate.

Example 10 may include or use, or may optionally be combined with the subject matter of at least one of Examples 1-9, to include or use, wherein the location client includes a geo fence application, an indoor navigation application, an outdoor navigation application, or a combination thereof.

Example 11 may include or use subject matter (such as an apparatus, a method, a means for performing acts, or a device readable memory including instructions that, when performed by the device, may cause the device to perform acts), such as may include or use operations (e.g., executed by one or more hardware processor) comprising receiving a location estimate request from one or more location clients, determining, using a power cost heuristic, a power cost of using each of a plurality of location providers in performing a location estimate in accord with the location estimate request, assigning the location estimate request to a location provider of the plurality of location providers associated with a lowest determined power cost, and providing the location estimate to the location client.

Example 12 may include or use, or may optionally be combined with the subject matter of Example 11, to include or use receiving one or more performance parameters associated with the location estimate request, the performance parameters comprising at least one of a maximum power, a maximum time, and a maximum error to be used in satisfying the location estimate request.

Example 13 may include or use, or may optionally be combined with the subject matter of at least one of Examples 11-12, to include or use receiving from each of the plurality of location providers a list of available operational states, each operational state including one or more of a plurality of characteristics including whether a location estimate is available upon request, a maximum time it takes to complete a location estimate, whether a periodic location estimate is available, a time period the periodic location estimate is available, a best case expected error in the location estimate, a worst case expected error in the location estimate, an energy consumption per unit time in performing the location estimate, an energy consumption per transition into the operational state, and an energy consumption per location estimate.

Example 14 may include or use, or may optionally be combined with the subject matter of Example 13, to include or use, wherein assigning the location estimate request to a location provider of the plurality of location providers includes comparing the one or more performance parameters to a characteristic of the plurality of characteristics and assigning the request to the location provider that includes a characteristic that best matches the performance parameter with the lowest determined power cost.

Example 15 may include or use, or may optionally be combined with the subject matter of at least one of Examples 11-14, to include or use, wherein the power cost heuristic includes the energy consumption per location estimate divided by a lowest common denominator of the time periods of periodic requests assigned to the location provider of the plurality of location providers.

Example 16 may include or use, or may optionally be combined with the subject matter of at least one of Examples 11-14, to include or use, wherein the power cost heuristic includes a sum of the energy consumption per unit time in performing the location estimate, the energy consumption per transition into the operational state, and the energy consumption per location estimate.

Example 17 may include or use, or may optionally be combined with the subject matter of at least one of Examples 11-6, to include or use assigning the received location estimate request to a different location provider of the plurality of location providers only if the different location provider provides the location estimate with a lower determined power cost, a lower maximum time it takes to complete a location estimate as detailed in the list of operational states, or a lower worst case expected error in the location estimate as detailed in the list of operational states than is provided by a location provider of the plurality of location providers currently assigned to perform the location estimate.

Example 18 may include or use, or may optionally be combined with the subject matter of at least one of Examples 11-17, to include or use, wherein the plurality of location providers include a Wi-Fi location provider, a satellite location provider, and a cellular location provider.

Example 19 may include or use, or may optionally be combined with the subject matter of at least one of Examples 11-18, to include or use, wherein the plurality of location providers determine the location estimate using a Time of Flight (ToF) of a signal from the device to the location provider and back to the device, triangulation and a Received Signal Strength Indication (RSSI) technique.

Example 20 may include or use, or may optionally be combined with the subject matter of at least one of Examples 11-19, to include or use, wherein the location client includes a geo fence application, an indoor navigation application, an outdoor navigation application, or a combination thereof.

Example 21 may include or use subject matter (such as an apparatus, a method, a means for performing acts, or a device readable memory including instructions that, when performed by the device, may cause the device to perform acts), such as may include or usereceive a location estimate request from one or more location clients, determine, using a power cost heuristic, a power cost of using each of a plurality of location providers in performing a location estimate in accord with the location estimate request, assign the location estimate request to a location provider of the plurality of location providers associated with a lowest determined power cost, and provide the location estimate to the location client.

Example 22 may include or use, or may optionally be combined with the subject matter of Example 21, to include or use receive one or more performance parameters associated with the location estimate request, the performance parameters comprising at least one of a maximum power, a maximum time, and a maximum error to be used in satisfying the location estimate request.

Example 23 may include or use, or may optionally be combined with the subject matter of at least one of Examples 21-22, to include or use receive from each of the plurality of location providers a list of available operational states, each operational state including one or more of a plurality of characteristics including whether a location estimate is available upon request, a maximum time it takes to complete a location estimate, whether a periodic location estimate is available, a time period the periodic location estimate is available, a best case expected error in the location estimate, a worst case expected error in the location estimate, an energy consumption per unit time in performing the location estimate, an energy consumption per transition into the operational state, and an energy consumption per location estimate.

Example 24 may include or use, or may optionally be combined with the subject matter of Example 23, to include or use, wherein the instructions for assigning the location estimate request to a location provider of the plurality of location providers include instructions, when executed by the machine, cause the machine to compare the one or more performance parameters to a characteristic of the plurality of characteristics and assigning the request to the location provider that includes a characteristic that best matches the performance parameter with the lowest determined power cost.

Example 25 may include or use, or may optionally be combined with the subject matter of at least one of Examples 21-24, to include or use, wherein the power cost heuristic includes the energy consumption per location estimate divided by a lowest common denominator of the time periods of periodic requests assigned to the location provider of the plurality of location providers.

Example 26 may include or use, or may optionally be combined with the subject matter of at least one of Examples 21-24, to include or use, wherein the power cost heuristic includes a sum of the energy consumption per unit time in performing the location estimate, the energy consumption per transition into the operational state, and the energy consumption per location estimate.

Example 27 may include or use, or may optionally be combined with the subject matter of at least one of Examples 21-26, to include or use, assign the received location estimate request to a different location provider of the plurality of location providers only if the different location provider provides the location estimate with a lower determined power cost, a lower maximum time it takes to complete a location estimate as detailed in the list of operational states, or a lower worst case expected error in the location estimate as detailed in the list of operational states than is provided by a location provider of the plurality of location providers currently assigned to perform the location estimate.

Example 28 may include or use, or may optionally be combined with the subject matter of at least one of Examples 21-27, to include or use, wherein the plurality of location providers include a Wi-Fi location provider, a satellite location provider, and a cellular location provider.

Example 29 may include or use, or may optionally be combined with the subject matter of at least one of Examples 21-28, to include or use, wherein the plurality of location providers determine the location estimate using a Time of Flight (ToF) of a signal from the device to the location provider and back to the device, triangulation and a Received Signal Strength Indication (RSSI) technique.

Example 30 may include or use, or may optionally be combined with the subject matter of at least one of Examples 21-29, to include or use, wherein the location client includes a geo fence application, an indoor navigation application, an outdoor navigation application, a hybrid indoor/outdoor navigation application, or a combination thereof.

Example 31 may include or use, or may optionally be combined with the subject matter of at least one of Examples 11-20, to include or use, a machine-readable medium including instructions, which when executed by a machine, cause the machine to perform operations of any of the methods of Examples 11-20.

Example 32 may include or use, or may optionally be combined with the subject matter of at least one of Examples 11-20, to include or use an apparatus comprising means for performing any of the methods of Examples 11-20.

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (NV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mm Wave) frequency band), e.g., a frequency band within the frequency band of between 20 Ghz and 300 GHZ, a WLAN frequency band, a WPAN frequency band, a frequency band according to the WGA specification, and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A mobile device comprising processing circuitry to:
receive a location estimate request from one or more location clients;
receive one or more performance parameters from the one or more location clients, the performance parameters comprising at least one of a maximum power, a maximum time, and a maximum error to be used in determining the location estimate of the device;
receive from each of a plurality of location providers a list of available operational states, each operational state including one or more of a plurality of characteristics including whether a location estimate is available upon request, a maximum time it takes to complete a location estimate, whether a periodic location estimate is available, a time period the periodic location estimate is available, a best case expected error in the location estimate, a worst case expected error in the location estimate, an energy consumption per unit time in performing the location estimate, an energy consumption per transition into the operational state, and an energy consumption per location estimate;

determine, using a power cost heuristic, a power cost of using each of the plurality of location providers in performing a location estimate in response to the location estimate request;

assign the location estimate request to a location provider of the plurality of location providers associated with a lowest determined power cost; and provide the location estimate to the one or more location clients that issued the location estimate request.

2. The device of claim 1, wherein the processing circuitry is further to assign the location estimate request to a location provider of the plurality of location providers by comparing the one or more performance parameters to a characteristic of the plurality of characteristics and assigning the request to the location provider that includes a characteristic that best matches the performance parameter with the lowest determined power cost.

3. The device of claim 2, wherein the power cost heuristic includes the energy consumption per location estimate divided by a lowest common denominator of the time periods of periodic requests assigned to the location provider of the plurality of location providers.

4. The device of claim 2, wherein the power cost heuristic includes a sum of the energy consumption per unit time in performing the location estimate, the energy consumption per transition into the operational state, and the energy consumption per location estimate.

5. The device of claim 4, wherein the plurality of location providers include a Wi-Fi location provider, a satellite location provider, and a cellular location provider.

6. The device of claim 5, wherein the plurality of location providers determine the location estimate using a Time of Flight (ToF) of a signal from the device to the location provider and back to the device, triangulation and a Received Signal Strength Indication (RSSI) technique.

7. The device of claim 4, wherein the processing circuitry is to assign the received location estimate request to a different location provider only if the different location provider provides the location estimate with a lower determined power cost, a lower maximum time it takes to complete a location estimate as detailed in the list of operational states, or a lower worst case expected error in the location estimate as detailed in the list of operational states than is provided by a location provider of the plurality of location providers currently assigned to perform the location estimate.

8. A method of performing a location estimate comprising operations performed by one or more hardware processor, the operations comprising:

receiving a location estimate request from one or more location clients;

receiving one or more performance parameters associated with the location estimate request, the performance parameters comprising at least one of a maximum power, a maximum time, and a maximum error to be used in satisfying the location estimate request;

receiving from each of a plurality of location providers a list of available operational states, each operational state including one or more of a plurality of characteristics including whether a location estimate is available upon request, a maximum time it takes to complete a location estimate, whether a periodic location estimate is available, a time period the periodic location estimate is available, a best case expected error in the location estimate, a worst case expected error in the location estimate, an energy consumption per unit time in performing the location estimate, an energy consumption per transition into the operational state, and an energy consumption per location estimate;

determining, using a power cost heuristic, a power cost of using each of the plurality of location providers in performing a location estimate in accord with the location estimate request;

assigning the location estimate request to a location provider of the plurality of location providers associated with a lowest determined power cost; and providing the location estimate to the location client.

9. The method of claim 8, wherein assigning the location estimate request to a location provider of the plurality of location providers includes comparing the one or more performance parameters to a characteristic of the plurality of characteristics and assigning the request to the location provider that includes a characteristic that best matches the performance parameter with the lowest determined power cost.

10. The method of claim 9, wherein the power cost heuristic includes the energy consumption per location estimate divided by a lowest common denominator of the time periods of periodic requests assigned to the location provider of the plurality of location providers.

11. The method of claim 9, wherein the power cost heuristic includes a sum of the energy consumption per unit time in performing the location estimate, the energy consumption per transition into the operational state, and the energy consumption per location estimate.

12. The method of claim 11, further comprising assigning the received location estimate request to a different location provider of the plurality of location providers only if the different location provider provides the location estimate with a lower determined power cost, a lower maximum time it takes to complete a location estimate as detailed in the list of operational states, or a lower worst case expected error in the location estimate as detailed in the list of operational states than is provided by a location provider of the plurality of location providers currently assigned to perform the location estimate.

13. At least one machine-readable medium comprising instructions, when performed by a machine, cause the machine to:

receive a location estimate request from one or more location clients;

receive one or more performance parameters associated with the location estimate request, the performance parameters comprising at least one of a maximum power, a maximum time, and a maximum error to be used in satisfying the location estimate request;

receive from each of the plurality of location providers a list of available operational states, each operational state including one or more of a plurality of characteristics including whether a location estimate is available upon request, a maximum time it takes to complete a location estimate, whether a periodic location estimate is available, a time period the periodic location estimate is available, a best case expected error in the location estimate, a worst case expected error in the location estimate, an energy consumption per unit time in performing the location estimate, an energy consumption per transition into the operational state, and an energy consumption per location estimate;

determine, using a power cost heuristic, a power cost of using each of a plurality of location providers in performing a location estimate in accord with the location estimate request;

assign the location estimate request to a location provider of the plurality of location providers associated with a lowest determined power cost; and provide the location estimate to the location client.

14. The machine-readable medium of claim 13, wherein the instructions for assigning the location estimate request to a location provider of the plurality of location providers include instructions, when performed by the machine, cause the machine to compare the one or more performance parameters to a characteristic of the plurality of characteristics and assigning the request to the location provider that includes a characteristic that best matches the performance parameter with the lowest determined power cost, wherein the power cost heuristic includes the energy consumption per location estimate divided by a lowest common denominator of the time periods of periodic requests assigned to the location provider of the plurality of location providers or a sum of the energy consumption per unit time in performing the location estimate, the energy consumption per transition into the operational state, and the energy consumption per location estimate.

* * * * *